United States Patent
Buchbut et al.

(10) Patent No.: US 9,948,339 B1
(45) Date of Patent: Apr. 17, 2018

(54) SPATIALLY DISTRIBUTED MODULE ARCHITECTURE

(71) Applicant: GM GLOBAL TECHNOLOGY OPERATIONS LLC, Detroit, MI (US)

(72) Inventors: Yohay Buchbut, Pardes-Hanna (IL); Nadav Lavi, Ramat-Hasharon (IL); Kobi J. Scheim, Pardess Hanna (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/479,559

(22) Filed: Apr. 5, 2017

(51) Int. Cl.
  *H04B 1/3822* (2015.01)
  *H04W 88/08* (2009.01)
  *H04W 88/10* (2009.01)

(52) U.S. Cl.
  CPC ......... *H04B 1/3822* (2013.01); *H04W 88/085* (2013.01); *H04W 88/10* (2013.01)

(58) Field of Classification Search
  CPC ............................ H04B 1/3822; H04W 4/046
  See application file for complete search history.

(56) References Cited

U.S. PATENT DOCUMENTS

| | | | |
|---|---|---|---|
| 2010/0208871 A1* | 8/2010 | Tanabe | A61G 13/00 378/98.8 |
| 2014/0118549 A1* | 5/2014 | Meldrum | B60R 1/00 348/148 |
| 2016/0344467 A1* | 11/2016 | Shelton | H04B 7/18506 |

* cited by examiner

*Primary Examiner* — Tuan H Nguyen
(74) *Attorney, Agent, or Firm* — Cantor Colburn LLP

(57) ABSTRACT

A spatially distributed module and method of assembling the spatially distributed module in a vehicle include disposing a first sub-module of the module in a first location of the vehicle, and disposing a second sub-module of the module in a second location of the vehicle that is spatially separated from the first location. The first sub-module includes a processor and a memory device and the second sub-module includes a first set of one or more components. The method includes coupling the second sub-module to the first sub-module via a flexible connector such that the first set of the one or more components in the second sub-module use the processor and the memory device in the first sub-module. A length of the flexible connector is at least equal to a minimum distance between the first location and the second location.

15 Claims, 3 Drawing Sheets

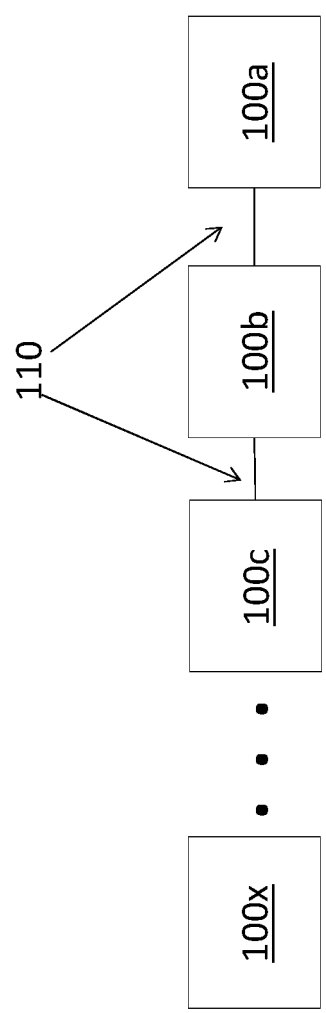

SPATIALLY DISTRIBUTED MODULE ARCHITECTURE

INTRODUCTION

The subject disclosure relates to vehicle wireless module architecture.

Vehicles (e.g., automobiles, construction equipment, farm equipment, automated manufacturing equipment) increasingly include electronic modules. For example, a wireless module with radio access technologies (RATs) that provide the underlying physical connection to a radio based communication network may include Bluetooth, Wi-Fi, fourth generation long term evolution (4G LTE), and IEEE 802.11ad (referred to as Wireless Gigabit Alliance (WiGig)) components. The RATs of the wireless module are typically housed together with a common processor and memory in a vehicle in order to provide wireless communication capability in the vehicle. As the number of such electronic modules (e.g., global positioning system (GPS) module, audio module) in the vehicle increase, physically accommodating a module like the wireless module is challenging. Accordingly, it is desirable to provide a spatially distributed module architecture that addresses at least the issues related to limited space.

SUMMARY

In one exemplary embodiment, a method of assembling a spatially distributed module in a vehicle includes disposing a first sub-module of the module in a first location of the vehicle. The first sub-module includes a processor and a memory device. The method also includes disposing a second sub-module of the module in a second location of the vehicle that is spatially separated from the first location. The second sub-module includes a first set of one or more components. The second sub-module is coupled to the first sub-module via a flexible connector such that the first set of the one or more components in the second sub-module use the processor and the memory device in the first sub-module. A length of the flexible connector is at least equal to a minimum distance between the first location and the second location.

In addition to one or more of the features described herein, a third sub-module of the module is disposed in a third location of the vehicle. The third sub-module includes a second set of one or more components.

In addition to one or more of the features described herein, the third sub-module is coupled, in addition to the second sub-module, to the first sub-module.

In addition to one or more of the features described herein, the coupling the third sub-module to the first sub-module includes the second set of the one or more components using the processor and the memory device in the first sub-module.

In addition to one or more of the features described herein, the coupling the third sub-module to the first sub-module includes the second set of the one or more components using the processor and the memory device in the first sub-module.

In addition to one or more of the features described herein, the coupling the third sub-module and the second sub-module to the first sub-module is through a multiplexer.

In addition to one or more of the features described herein, the coupling the third sub-module to the first sub-module is through the second sub-module.

In another exemplary embodiment, a spatially distributed module in a vehicle includes a first sub-module in a first location of the vehicle. The first sub-module includes a processor and a memory device. A second sub-module is in a second location of the vehicle that is spatially separated from the first location. The second sub-module includes a first set of one or more components. The module also includes a flexible connector from the second sub-module configured to couple the second sub-module to the first sub-module such that the first set of the one or more components in the second sub-module use the processor and the memory device in the first sub-module.

In addition to one or more of the features described herein, a length of the flexible connector is at least equal to a minimum distance between the first location and the second location.

In addition to one or more of the features described herein, a third sub-module is located in a third location of the vehicle. The third sub-module includes a second set of one or more components.

In addition to one or more of the features described herein, the module includes a second flexible connector from the third sub-module configured to couple the second sub-module to the first sub-module.

In addition to one or more of the features described herein, the second set of the one or more components use the processor and the memory device in the first sub-module.

In addition to one or more of the features described herein, the first flexible connector and the second flexible connector respectively couple the second sub-module and the third sub-module to the first sub-module through a multiplexer.

In addition to one or more of the features described herein, the third sub-module connects to the first sub-module through the second sub-module.

In addition to one or more of the features described herein, the first set of the one or more components includes a radio access technology (RAT).

In addition to one or more of the features described herein, the RAT supports Bluetooth, Wi-Fi, fourth generation long term evolution (4G LTE), or IEEE 802.11ad protocols.

In addition to one or more of the features described herein, the first set of one or more components is two or more cellular modems.

In addition to one or more of the features described herein, the processor of the second sub-module uses the two or more cellular modems as one virtual cellular modem.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3 is a block diagram of yet another exemplary embodiment of a spatially distributed wireless module.

DETAILED DESCRIPTION

The following description is merely exemplary in nature and is not intended to limit the present disclosure, its application or uses.

As previously noted, physically accommodating the increasing number of electronic modules in a vehicle is challenging. Some components must be located in specific areas of the vehicle. For example, the audio controls and GPS user interface must be accessible to the driver. Other components, such as the GPS receiver or the wireless module that includes the multiple RATs available in a given vehicle, are not required to be in a specific area of the vehicle. However, housing all the components of the module together creates a larger package and, thus, limits the areas where the modules can be located. Embodiments of the systems and methods detailed herein relate to a spatially distributed module architecture. While other electronic modules can benefit from the architecture detailed here, the wireless module is specifically discussed for explanatory purposes.

Figure 1:
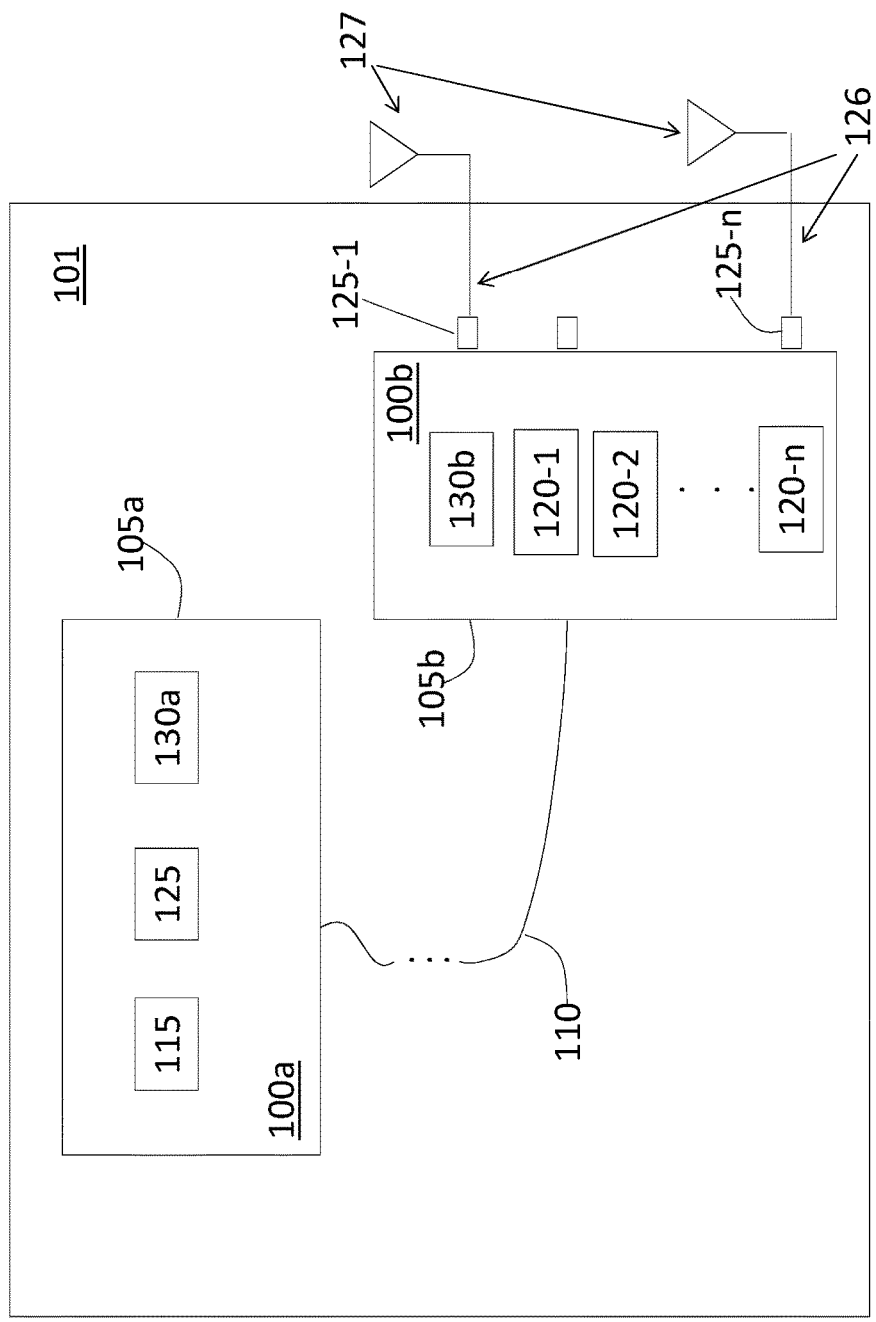
FIG. 1 is a block diagram of an exemplary embodiment of a spatially distributed wireless module in a vehicle.

In accordance with an exemplary embodiment, FIG. 1 shows a block diagram of an exemplary spatially distributed wireless module 100a, 100b (referred to collectively as 100) in a vehicle 101. According to the spatially distributed module architecture, the wireless module 100 is split into at least two housings 105a, 105b (referred to collectively as 105) that are spatially distributed within the vehicle 101. In the exemplary case shown in FIG. 1, a high data rate technology chip 130a, one or more processors 115, and one or more memory devices 125 are housed together as wireless module 100a in housing 105a. Multiple RATs 120-1 through 120-n (referred to generally as 120) are housed together with a high data rate technology chip 130b as wireless module 100b in housing 105b. The high data rate technology chips 130a, 130b (generally referred to as 130) function as interconnect technology for the different formats and protocols of data coming into and out of the modules 100. The processor 115 and memory device 125 in the wireless module 100a are shared by all of the RATs 120 and, among other activities, facilitate the user interaction with each of the RATs 120.

The two parts of the wireless module 100 (i.e., 100a, 100b) are connected by a module connector 110. The module connector 110 is flexible and the length can be selected such that the module connector 110 reaches from the wireless module 100a to the spatially separated wireless module 100b. That is, the minimum length of the module connector 110 is the minimum distance between the locations of the wireless modules 110a, 110b. For purposes of routing the flexible module connector 110 around the vehicle 101 such that it is not necessarily visible in the cabin of the vehicle 101, the length of the module connector 110 is likely to be longer than this minimum distance. For example, when the wireless module 100a is closer to one end of the vehicle 101 (e.g., behind the dashboard) and the wireless module 100b is closer to an opposite end of the vehicle 100b, the module connector 110 may be routed around a perimeter of the cabin of the vehicle 101 rather than directly down the middle, for example. The module connector 110 is a high data rate, high bandwidth connection using a wireless link or a physical medium such as fiber or copper (e.g., unshielded twisted pair (UTP)) and facilitating communication at data rates of 1 gigabit per second (Gbps) or higher. The module connector 110 can support protocols such as Bluetooth, multi-gigabit Ethernet, InfiniBand, Wi-Fi, WiGig, and the HDBaseT standard.

By making the wireless modules 100a, 100b spatially separable, the heat generated by a single wireless module 100 that includes all the components that are shown distributed among two housings 105a, 105b in FIG. 1 is also distributed. The resulting reduction in heat dissipation by each of the housings 105a, 105b in comparison with a singular module increases the flexibility in placement of the wireless modules 100a, 100b.

The housing 105b includes antenna connectors 125-1 through 125-n (referred to generally as 125) that facilitate a connection from each RAT 120 via coaxial cable 126 to an antenna 127. The coaxial cable 126 can be expensive in comparison to copper wire or other material of the module connector 110. The coaxial cable 126 can also be difficult to route in comparison to the module connector 110. In addition, as the length of the coaxial cable 126 increases, the signal strength decreases proportionately (in most cases geometrically decaying as in linear systems). Thus, the wireless module 100b can be located physically closer to the antennas 127 of the vehicle 101 in order to reduce the length of coaxial cable 126 that is needed.

Figure 2:
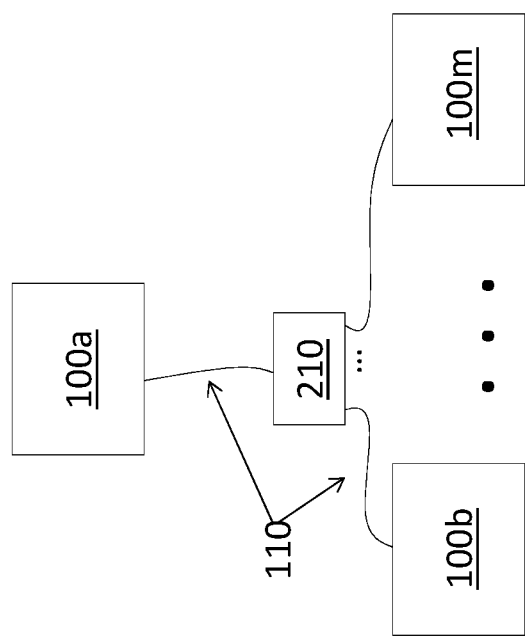
FIG. 2 is a block diagram of another exemplary embodiment of a spatially distributed wireless module.

FIG. 2 is a block diagram of an exemplary spatially distributed wireless module 100 according to a different embodiment than the one shown in FIG. 1. In alternate embodiment shown in FIG. 2, multiple wireless modules 100b through 100m connect to the wireless module 100a that includes the processor 115 and memory device 125 through a multiplexer 210. Each of the wireless modules 100b through 100m includes one or more RATs 120. The distribution of the RATs 120 into two or more wireless modules 100b through 100m facilitates the placement of the RATs 120 in different locations within the vehicle 101. Because each of the wireless modules 100b through 100m connects to the wireless module 100a that includes the processor 115 and memory device 125, each of the wireless modules 100b through 100m does not include a separate processor 115 or memory device 125. As a result, the benefits of a distributed architecture can be achieved (e.g., reduced heat dissipation by each housing 105, the ability to locate each distributed wireless module 100a through 100m in a smaller space than an integrated wireless module 100) without the need to repeat components in each additional wireless module 100b through 100m.

FIG. 3 is a block diagram of an exemplary spatially distributed wireless module 100 according to yet another embodiment. In the embodiment shown in FIG. 3, the multiple wireless modules 100a through 100x are interconnected in a cascaded manner. As such, wireless module 100b connects, via a module connector 110, to wireless module 100a, wireless module 100c connects, via a module connector 110, to wireless module 100b and, thus, through wireless module 100b to wireless module 100a, and so on. This embodiment does not require a multiplexer 210, as shown in FIG. 2.

According to the embodiments described herein, the upgrade or replacement of a given RAT 120 in a given wireless module 100 or the addition of a RAT 120 to the given wireless module 100 does not require disturbing any of the other wireless modules 100. Thus, the separation of the RATs 120 from the wireless module 100 that includes the processor 115 and memory device 125 and, as in the embodiment shown in FIG. 2, further separating the wireless modules 100 that include the RATs 120 facilitates simplified removal, addition, or upgrade of the RATs 120.

The spatially distributed module architecture according to one or more embodiments discussed herein facilitates increased data rate and bandwidth. For example, according to the arrangement shown in FIG. 1, the RATs 120 can be a set of cellular modems. The processor 115 in the wireless module 100a could address the set of cellular modems in the wireless module 100b as one cellular modem, but the functionality could be divided among the full set of cellular modems. This arrangement would facilitate the set of cellular modems in the wireless module 100b to behave as one virtual cellular modem from the perspective of the wireless module 100a. While one cellular modem provides 1 Gbps throughput, for example, the virtual cellular modem consisting of the set of cellular modems could provide much higher throughput (on the order of 100 megabits per second (Mbps)). According to an exemplary embodiment, the increased bandwidth and throughput provided by the spatially distributed module architecture may support autonomous operation of the vehicle.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of assembling a spatially distributed module in a vehicle, the method comprising:
   disposing a first sub-module of the module in a first location of the vehicle, wherein the first sub-module includes a processor and a memory device and a first radio access technology (RAT);
   disposing a second sub-module of the module in a second location of the vehicle that is spatially separated from the first location, wherein the second sub-module includes a first set of one or more components and a second RAT, wherein the first RAT and the second RAT support Bluetooth, Wi-Fi, fourth generation long term evolution (4G LTE), or IEEE 802.11ad protocols; and
   coupling the second sub-module to the first sub-module via a flexible connector such that the first set of the one or more components in the second sub-module use the processor and the memory device in the first sub-module, wherein a length of the flexible connector is at least equal to a minimum distance between the first location and the second location and the flexible connector supports communication at a data rate of at least 1 gigabit per second (Gbps).

2. The method according to claim 1, further comprising disposing a third sub-module of the module in a third location of the vehicle, wherein the third sub-module includes a second set of one or more components.

3. The method according to claim 2, further comprising coupling the third sub-module, in addition to the second sub-module, to the first sub-module.

4. The method according to claim 3, wherein the coupling the third sub-module to the first sub-module includes the second set of the one or more components using the processor and the memory device in the first sub-module.

5. The method according to claim 3, wherein the coupling the third sub-module and the second sub-module to the first sub-module is through a multiplexer.

6. The method according to claim 2, wherein the coupling the third sub-module to the first sub-module is through the second sub-module.

7. A spatially distributed module in a vehicle, the spatially distributed module comprising:
   a first sub-module in a first location of the vehicle, wherein the first sub-module includes a processor and a memory device and a first radio access technology (RAT);
   a second sub-module in a second location of the vehicle that is spatially separated from the first location, wherein the second sub-module includes a first set of one or more components and a second RAT, wherein the first RAT and the second RAT support Bluetooth, Wi-Fi, fourth generation long term evolution (4G LTE), or IEEE 802.11ad protocols; and
   a flexible connector from the second sub-module configured to couple the second sub-module to the first sub-module such that the first set of the one or more components in the second sub-module use the processor and the memory device in the first sub-module and the flexible connector supports communication at a data rate of at least 1 gigabit per second (Gbps).

8. The module according to claim 7, wherein a length of the flexible connector is at least equal to a minimum distance between the first location and the second location.

9. The module according to claim 7, further comprising a third sub-module in a third location of the vehicle, wherein the third sub-module includes a second set of one or more components.

10. The module according to claim 9, further comprising a second flexible connector from the third sub-module configured to couple the second sub-module to the first sub-module.

11. The module according to claim 10, wherein the second set of the one or more components use the processor and the memory device in the first sub-module.

12. The module according to claim 10, wherein the first flexible connector and the second flexible connector respectively couple the second sub-module and the third sub-module to the first sub-module through a multiplexer.

13. The module according to claim 9, wherein the third sub-module connects to the first sub-module through the second sub-module.

14. The module according to claim 7, wherein the first set of one or more components is two or more cellular modems.

15. The module according to claim 14, wherein the processor of the second sub-module uses the two or more cellular modems as one virtual cellular modem.

* * * * *